United States Patent [19]

Mizuno et al.

[11] Patent Number: 4,469,933
[45] Date of Patent: Sep. 4, 1984

[54] CONSUMABLE ELECTRODE TYPE ARC WELDING POWER SOURCE

[75] Inventors: Masanori Mizuno; Hirohisa Segawa; Takaji Mizuno, all of Aichi, Japan

[73] Assignee: Mitsubishi Denki Kabushiki Kaisha, Tokyo, Japan

[21] Appl. No.: 349,553

[22] Filed: Feb. 17, 1982

[30] Foreign Application Priority Data

Feb. 27, 1981 [JP] Japan .................................. 56-28084

[51] Int. Cl.³ .............................................. B23K 9/10
[52] U.S. Cl. ........................... 219/130.21; 219/137 PS
[58] Field of Search ....................... 219/130.21, 130.31, 219/130.32, 130.33

[56] References Cited

U.S. PATENT DOCUMENTS

| | | | |
|---|---|---|---|
| 3,792,225 | 2/1974 | Needham et al. | 219/130.21 |
| 3,809,853 | 5/1974 | Manz | 219/130.21 |
| 4,000,374 | 12/1976 | De Keyser | 219/130.33 |
| 4,020,320 | 4/1977 | Pijls et al. | 219/130.21 |
| 4,125,759 | 11/1978 | Kiyohara et al. | 219/130.32 |
| 4,300,035 | 11/1981 | Johansson | 219/130.21 |
| 4,301,355 | 11/1981 | Kimbrough et al. | 219/130.31 |

Primary Examiner—C. C. Shaw
Attorney, Agent, or Firm—Sughrue, Mion, Zinn, Macpeak, and Seas

[57] ABSTRACT

A power source includes first and second control circuit for controlling the current provided during short-circuit and arc intervals, respectively. A transistor in series with the power supply is controlled in response to either of the control circuits.

10 Claims, 20 Drawing Figures

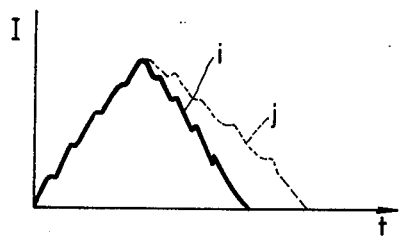
FIG. 7B
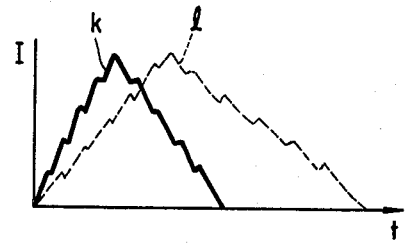
FIG. 7C
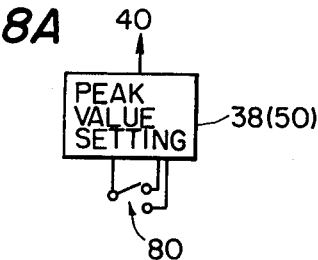
FIG. 8A
FIG. 8B
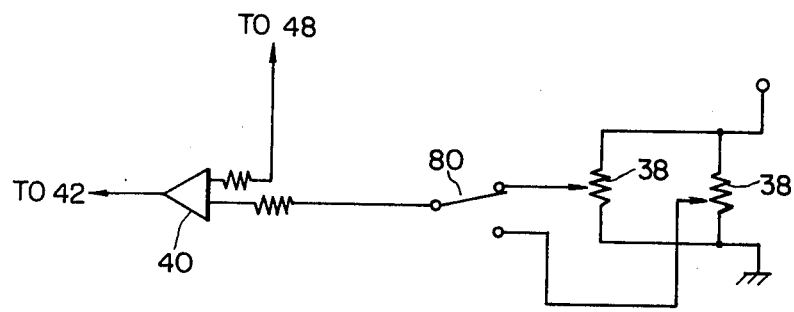

CONSUMABLE ELECTRODE TYPE ARC WELDING POWER SOURCE

BACKGROUND OF THE INVENTION

The present invention relates to a consumable electrode type arc welding power source. More particularly, the invention relates to a power source for a consumable electrode type arc welding machine for short-circuit transfer welding with a switching element, e.g. a transistor, as a primary welding current control element.

With a conventional arc welding power source operated by a DC voltage, desired welding characteristics are obtained by connecting a reactor 1 having an inductance component L to a primary welding current branch circuit as shown in FIG. 1 and suitably selecting the value of the inductance L of the element. In FIG. 1, reference numeral 2 designates a DC power source. When a welding operation is carried out by short-circuit transfer welding in this case, a load voltage U will vary as shown in FIG. 2A and the welding current will vary as shown in FIG. 2B. Assuming that a no-load voltage of the DC power source 2 is designated by E, the rate of current increase becomes substantially $dI/dt = E/L$. In FIGS. 2A and 2B, the period A is a time duration during which a short-circuit current flows from a wire electrode to a base material to be welded. The short-circuit current is gradually increased, while the increase in the short-circuit current is restricted by the reactor 1, during the period A until the molten portion of the wire electrode is then separated and transferred from the short-circuit state to the separated arc generating state by an electromagnetic pinch strength which increases with respect to the vibration of the molten portion of the wire electrode on the base material. The period B is a time duration during which an arc is produced so that the end of the wire electrode deposited on the base material is heated to a high temperature and is molten together with the base material due to the heat of the arc. Thus, in the short-circuit transfer welding, the short-circuit period A is the time interval during which the molten portion of the wire electrode is transferred to the base material to be welded and the arc producing period B is the time interval during which the transferred end of the wire electrode and the base material are heated and molten. When such two periods are repeated, the short-circuit transfer welding can be effected. The length of the arc production period is determined by the value of the inductance and the value of the no-load voltage E, and the ratio of the short-circuit period to the arc production period is determined only by the value of the inductance.

The characteristics of the arc welding power source the above described short-circuit period and the arc producing period are important factors in determining the amount of spatter due to the short-circuit welding, the penetration depth and so forth. In order to adjust the characteristics in a variety of states, it is necessary to connect reactors 1 having various inductance values or to control the power source output voltage to various values, neither of which procedures is easy. Particularly, it is very difficult to switch the various reactors 1. Further, in case of large current, it is difficult to adjust the reactors, and it is also necessary to employ considerably expensive elements for the reactors 1 due to their large size.

SUMMARY OF THE INVENTION

Accordingly, a primary object of the invention is to provide a consumable electrode type arc welding power source in which all of the above-described difficulties accompanying a conventional arc welding power source are eliminated and in which the arc producing time limit, the short-circuit current rising characteristic and the arc current falling characteristic can be arbitrarily and independently varied with a simple operation.

Another object of the invention is to provide a consumable electrode type arc welding power source in which various welding characteristics, i.e., the number of short-circuit times, the quantity of spatter and the penetration depth can be very simply adjusted.

A further object of the invention is to provide a consumable electrode type arc welding power source in which only electronic components are employed to facilitate an adjustment inexpensively.

A still further object of the invention is to provide a consumable electrode type arc welding power source in which it is unnecessary to switch various taps of a reactor.

A particular object of the invention is to provide a consumable electrode type arc welding power source in which the welding performance is determined by flowing an arc current having a predetermined peak value for a predetermined time limit after the short-circuit current has ended, and can be readily varied depending upon the base material to be welded.

Briefly, these and other objects are achieved by providing first and second maximum value control circuits one of which limits the maximum current value in the short-circuit interval and the other of which limits the maximum current during the arc interval. A timer controls the duration of the arc interval. If desired, the control voltages in each of the control circuits can be varied.

BRIEF DESCRIPTION OF THE DRAWINGS

The nature, principle and utility of the invention will become more apparent from the following description when read in conjuction with the accompanying drawings, in which:

FIGS. 7A through 7C are graphical representations indicating the characteristic curves of the short-circuit current in various cases;

FIG. 8 is a block diagram showing the essential part of still another preferred embodiment of the invention; and FIG. 8B is a circuit diagram showing in more detail the embodiment of FIG. 8A.

DESCRIPTION OF THE PREFERRED EMBODIMENTS

Figure 1:
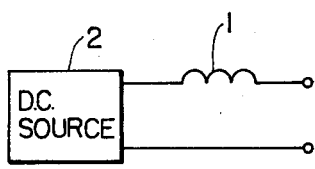
FIG. 1 is a circuit diagram showing a conventional arc welding power source.
Figure 2A:
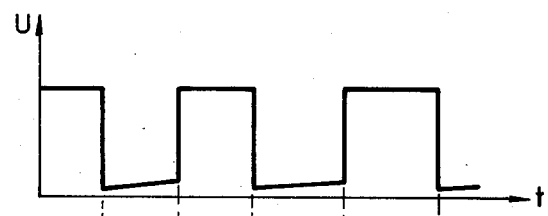
FIGS. 2A and 2B are graphical representations indicating the characteristic curves of the load voltage and current of the conventional arc welding power source.
Figure 2B:
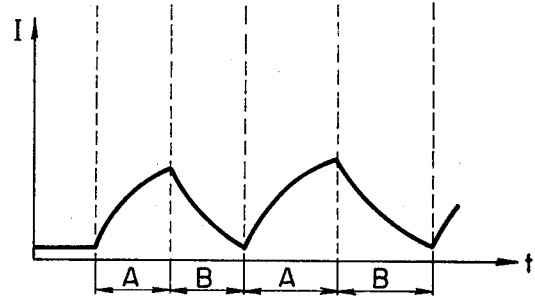
Figure 3A:
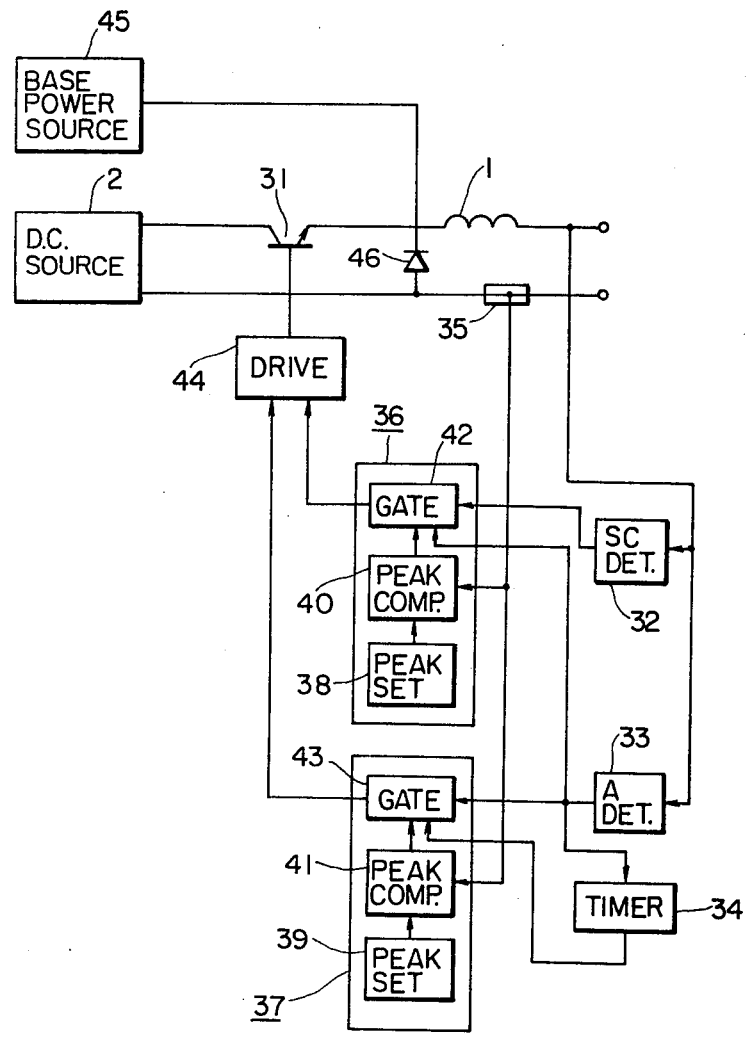
FIGS. 3A and 3B are block and circuit diagrams showing a preferred embodiment of the arc welding power source constructed according to the invention.

A preferred embodiment of a consumable electrode type arc welding power source according to the invention is shown in FIG. 3A, in which reference numeral 31 designates a transistor, 32 a short-circuit detecting circuit to which the output terminal voltage of the power source is inputted, 33 an arc voltage detecting circuit to which the output terminal voltage of the power source is similarly inputted, 34 a timer circuit to which the output of the arc voltage detecting circuit 33 is inputted, 35 a current detector provided in series with the primary current branch circuit, 36 a first pulse current generating circuit to which the outputs of the short-circuit detecting circuit 32, the arc voltage detecting circuit 33 and the current detector 35 are inputted, 37 a second pulse current generating circuit to which the outputs of the arc voltage detecting circuit 33, the timer circuit 34 and the current detector 35 are inputted, 38 a first peak value setting unit, 39 a second peak value setting unit, 40 a first peak comparator to which the set value of the first peak value setting unit 38 and the output of the current detector 35 are inputted, and 41 a second peak comparator to which the set value of the second peak value setting unit 39 and the output of the current detector 35 are inputted. Reference numeral 42 designates a first pulse gate circuit to which the outputs of the short-circuit detecting circuit 32, the arc voltage detecting circuit 33 and the first peak value setting unit 40 are inputted, and reference numeral 43 designates a second pulse gate circuit to which the outputs of the arc voltage detecting circuit 33, the timer circuit 34 and the second peak comparator 41 are inputted. Reference numeral 44 designates a drive circuit to which the outputs of the first pulse generating circuit 36 and the second pulse generating circuit 37 are inputted. Reference numeral 45 designates a base power source, the output of which is connected to the primary current branch circuit. Reference numeral 46 designates a flywheel diode.

The operation of the consumable electrode type arc welding power source thus constructed will now be described.

When the welding operation is started, an output is produced from the base power source 45. Simultaneously, the wire electrode is fed toward the base material to be welded by a wire feeding unit (not shown) until the wire is short-circuited to the base material in a well known manner. At that time, the output terminal voltage is abruptly decreased. When the short-circuit detecting circuit 32 detects the abrupt decrease of the output terminal voltage, it feeds a signal (preferably digital) to the first pulse current generating circuit 36. When the signal is applied to the first pulse gate circuit 42 in the first pulse current generating circuit 36, the first pulse gate circuit 42 produces a drive signal to the drive circuit 44. As a result, the drive circuit 44 will drive the transistor 31. Thus, the short-circuit current flows to the external load (not shown) through the transistor 31 and the reactor 1 from the DC power source 2. The short-circuit current is allowed to gradually increase by the reactor 1, and, when the short-circuit current has increased to a certain degree, the end of the wire electrode becomes molten and separates from the electrode by the electromagnetic pinch force. This interrupts the short-circuit between the electrode and base material, and an arc is produced at that time which bridges the newly formed gap between the electrode and base material. Since the output of the short-circuit detecting circuit 32 is stopped at this time and an arc voltage is inputted to the arc voltage detecting circuit 33, the latter will produce an output signal (preferably digital). This signal is in turn applied to the first pulse gate circuit 42, which subsequently stops producing its output.

The output signal of the arc voltage detecting circuit 33 is also inputted to the second pulse gate circuit 43 in the second pulse current generating circuit 37. Consequently, the second pulse gate circuit 43 will produce a drive signal to the drive circuit 44, which in turn produces an output to the transistor 31 to thus drive the transistor 31. It is noted, however, that at this time the arc current is set to a value lower than the maximum value of the short-circuit current. More particularly, with the arc current set to a value lower than the maximum value of the short-circuit current in the second peak value setting unit 39, the detection signal from the current detector 35 is compared with the lower set value in the second peak comparator 41. The output of the second peak comparator 41 is in turn inputted to the second pulse gate circuit 43 to allow the drive circuit 44 to produce an output so that the peak value of the arc current always becomes a set value.

The output of the arc voltage detecting circuit 33 is also inputted to the timer circuit 34. That is, when an arc is being generated and a predetermined time has elapsed, the timer circuit 34 will produce a countup signal to the second pulse gate circuit 43 to stop the operation of the gate circuit 43. As a result, the transistor 31 is shut off through the drive circuit 44, and the arc is maintained with only a small base current by the base power source 45.

When the arc current is at a relatively large value determined by the conducting transistor 31 and the circulating operation of the flywheel diode 46 from the DC power source 2, the end of the wire electrode is heated and molten by the arc heat to thus result in a predetermined arc length. However, the wire end heating and melting effect is small when only the base current is being provided, and the arc length thus consequently becomes gradually shorter as the electrode continues to advance toward the base material. Thus, the molten portion of the electrode wire end is soon again short-circuited with the base material to be welded. When the above described short-circuit between the wire electrode and the base material and the consequent production of the arc are repeated, short-circuit transfer welding can be carried out to melt the wire electrode, and to melt the base material to be welded and transfer the molten portion of the wire electrode to the base material to be welded.

Figure 4A:
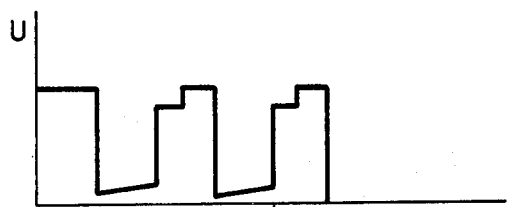
FIGS. 4A and 4B are graphical representations indicating the welding voltage and current of the arc welding power source of the invention.
Figure 4B:
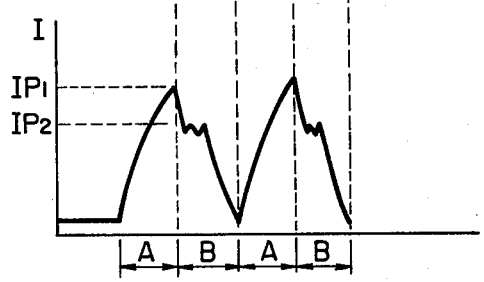

It is noted that the set value of the first peak value setting unit 38 is always compared with the output of the current detector 35 by the first peak comparator 40 to thus control the maximum value of the short-circuit current so as not to exceed the maximum rated standards to the transistor 31. FIG. 4A shows the load voltage at the output terminals, and FIG. 4B shows the current at corresponding times. The period A is a time interval in which the short-circuit current flows from the wire electrode to the base material to be welded. The period B is a time interval in which the arc is produced, and the current $I_{p2}$ at this time is smaller than the maximum value $I_{p1}$ of the short-circuit current.

Figure 3B:
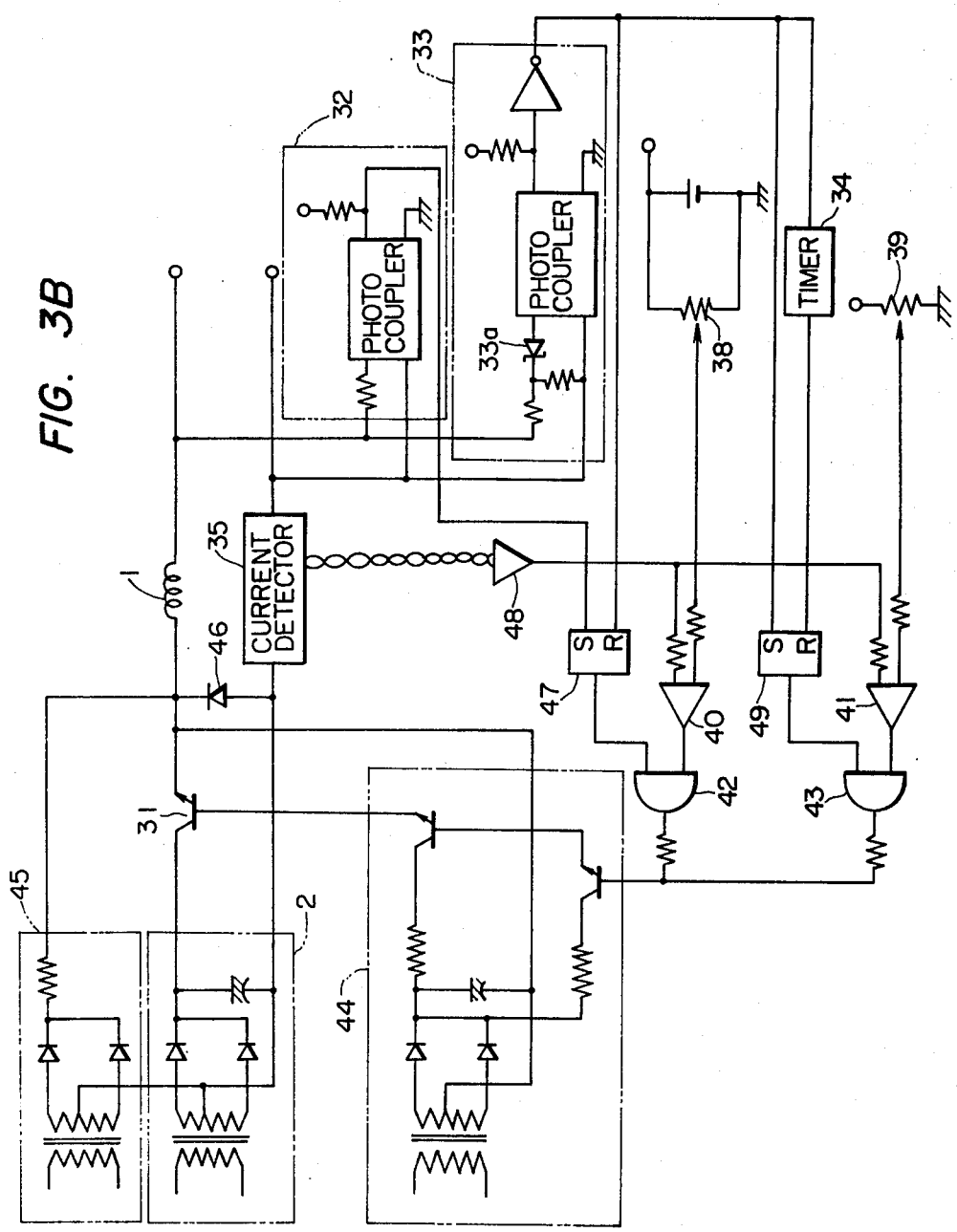

FIG. 3B shows a more detailed circuit diagram of a preferred embodiment of the arc welding power source according to the invention. When the short-circuit detecting circuit 32 detects the short-circuit current, it produces a high level "H" output to the set S input of a first flip-flop 47. Thus, the flip-flop 47 will produce a high level "H" output to enable the first pulse gate circuit 42. As a result, the first pulse gate circuit 42 produces an output in accordance with the output of the first peak comparator 40. The first peak comparator 40 will compare a signal, detected at the output by the current detector 35 and amplified by the amplifier 48, with the set value from the first peak value setting unit 38 to produce a low level "L" signal when the former is higher than the latter and to produce a high level "H" signal when the former is lower than the latter. When the first pulse gate circuit 42 produces the "H" signal, which drives the drive circuit 44, the drive circuit 44 drives the transistor 31. The maximum value of the output current is retained at a predetermined value defined by the first peak value setting unit 38 by the feedback effect of the first peak comparator 40.

When the short-circuit interval ends with the melting away of the electrode tip, the arc is then produced and the short-circuit detecting circuit 32 produces the "L" output. Simultaneously, the arc-voltage at that time is applied to a constant-voltage zener diode 33a in the arc voltage detecting circuit 33, which circuit 33 in turn produces an "H" output signal. This "H" signal is applied to the reset R input of the first-flop 47, which thus produces an "L" output to disable the first pulse gate circuit 42. At this time the "H" signal from circuit 33 is also applied to the set S input of a second flip-flop 49, which consequently produces an "H" output to enable the second pulse gate circuit 43. As a consequence, the second pulse gate circuit 43 will produce an output in accordance with the output of the second peak comparator 41. As a result, the transistor 31 will operate in response to the output of the second peak value setting unit 39 and produce an output current which becomes a predetermined value defined by the second peak value setting unit 39.

The timer circuit 34 will begin timing when the output of the voltage detecting circuit 33 becomes "H" level and will produce a timeup signal after a predetermined time limit, which timeup signal is in turn applied to the reset R input of the second flip-flop 49 to change the output of the second flip-flop 49 to the "L" level. Therefore, the second pulse gate circuit 43 is turned off to stop the operation of the transistor 31. The timer 34 may be a simple time constant circuit but is more preferably a counter for counting a source of clock pulses (not shown).

Figure 5A:
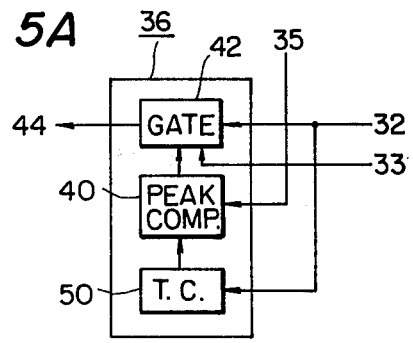
FIG. 5A is a block diagram showing an essential part of another preferred embodiment of the arc welding power source of the invention.

In FIG. 5A, which shows another preferred embodiment of the invention, a first time constant circuit 50 the output of which rises at an arbitrary time constant is provided as the peak set value upon reception of the output from the short-circuit detecting circuit 32. This replaces the first peak value setting unit 38.

Figure 5B:
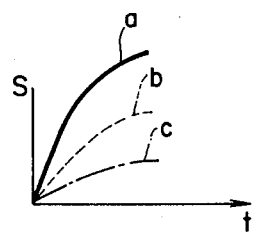
FIGS. 5B and 5C are graphical representations indicating the output waveforms of the circuit of the embodiment of FIG. 5A.
Figure 5C:
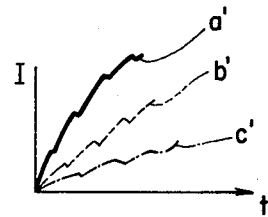

In FIG. 5B, different set values of the short-circuit current at the output of the first time constant circuit 50 are indicated by a, b and c. In the graph shown in FIG. 5B, time t is indicated on the abscissa axis, and the set value S is indicated on the ordinate axis. When the set value varies as shown in FIG. 5B, the short-circuit current exhibits the rise characteristics as designated by the curves a', b' and c' in FIG. 5C. More particularly, the effect exhibited is equivalent to the variation of the inductance value of the reactor 1 provided in the primary welding current branch circuit. In this case the time constant of the rise of the curve can be altered by a simple operation such as turning the knob of a variable resistor.

Figure 5D:
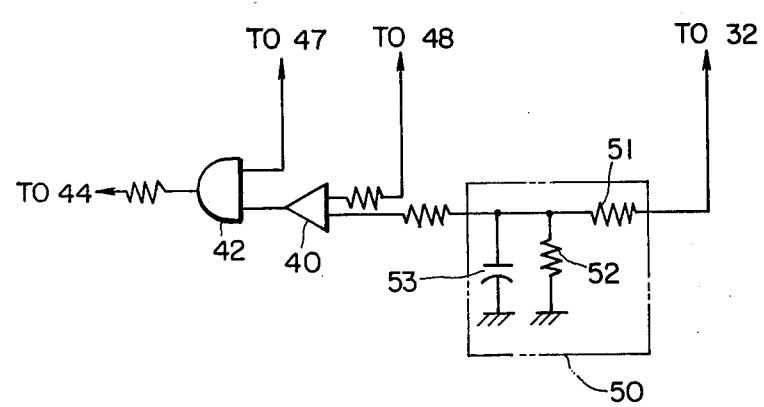
FIG. 5D is a circuit diagram showing in more detail the essential circuit components of the embodiment of FIG. 5A.

FIG. 5D shows the essential components of the embodiment of FIG. 5A. In FIG. 5D, when the short-circuit detecting circuit 32 detects the short-circuit and produces an "H" level output, a capacitor 53 is charged through charging resistor 51. The charging curve at that time becomes the set value of the output current during the short-circuit interval. A discharging resistor 52 serves to discharge the charge stored in the capacitor 53 during the arc interval. The resistor 51 could be variable.

Figure 6D:
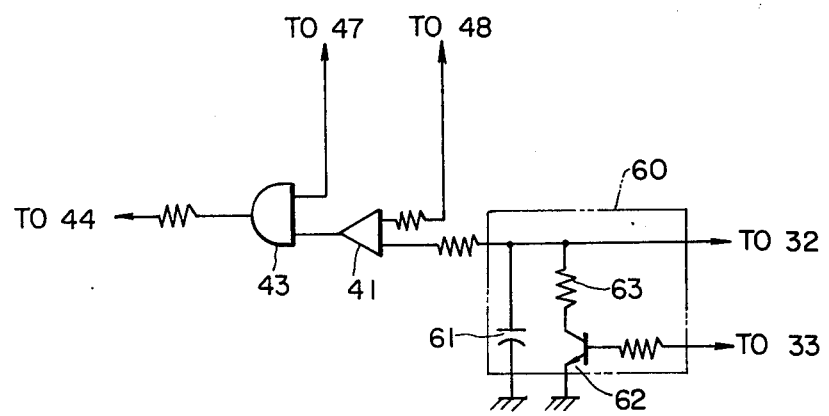
FIG. 6D is a circuit diagram showing in more detail the essential circuit components of a preferred example of the embodiment of FIG. 6A.
Figure 6A:
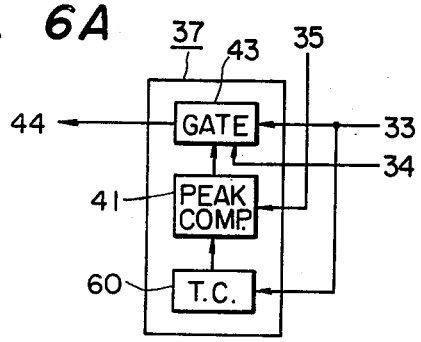
FIG. 6A is a block diagram showing an essential part of a still further preferred embodiment of the invention.

FIG. 6A shows a still further preferred embodiment of the invention in an essential circuit diagram. In FIG. 6A, a second time circuit 60 the output of which decreases at an arbitrary rate in response to the output of the arc voltage detecting circuit 33 is provided instead of the second peak value setting unit 39.

Figure 6B:
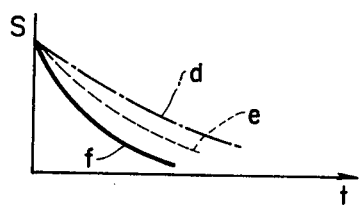
FIGS. 6B and 6C are graphical representations similar to FIGS. 5B and 5C but referring to the embodiment of FIG. 6A.
Figure 6C:
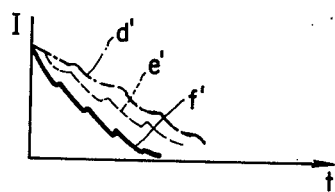

In FIG. 6B, the set values of the arc current at the output of the circuit 60 are indicated by d, e and f. When the set value varies as shown in FIG. 6B, the arc current will exhibit the falling characteristics as designated by the curves d', e' and f' in FIG. 6C. More specifically, the effect obtained is equivalent to the varying the inductance value of the reactor 1 provided in the primary welding current branch circuit. In this case, the time constant of the decrease of the curve can be altered by a simple operation such as turning the knob of a variable resistor.

Figure 7A:
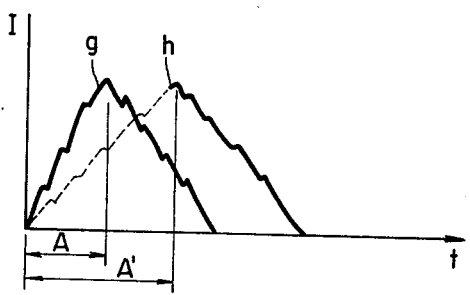

FIGS. 7A through 7C show the welding current on the ordinate axis and time on the abscissa axis. FIG. 7A shows short circuit currents having two different rising characteristics g and h in comparison. Reference characters A, A' represent the short-circuit intervals. FIG. 7B shows two different variations in the falling characteristics of the arc current by i and j in comparison. FIG. 7C shows two different variations in the rising characteristic of the short-circuit current and in the falling characteristic of the arc current in comparison by k and l. Thus, the rising characteristic of the short-circuit current and the falling characteristic of the arc current can be individually and arbitrarily set.

It should be understood from the experimental data that in short-circuit transfer welding the maximum current at the time of short-circuit depends substantially upon the diameter of the wire electrode used in such a manner that if the maximum current is restricted to smaller values in the respective diameters of the wire electrodes, the amount of spatter produced and the spattering distance are reduced.

FIG. 6D shows a circuit diagram of the embodiment of FIG. 6A. In FIG. 6D, when the charge stored on the capacitor 61 during the short-circuit interval is discharged through a discharging resistor 63 at a predetermined time constant by applying the "H" level signal from the arc voltage detecting circuit 33 thereto and thus turning on a transistor 62, a voltage across the capacitor 61 is lowered, and the set value of the output voltage is thus also lowered at a predetermined time constant. The resistor 63 could be variable.

FIG. 8A shows still another preferred embodiment of the invention in an essential circuit diagram. In FIG. 8A, a wire diameter changeover switch 80 is provided in the first peak value setting unit 38 or the first time constant circuit 50. The maximum value of the short-circuiting current and hence the maximum peak value of the first pulse current is thus determined for each of a plurality of different wire electrode diameters. Thus, the maximum short-circuiting current can be properly limited so as to reduce both the amount of spatter and the spattering distance. FIG. 8B shows in more detail one example of the embodiment of FIG. 8A.

It should be appreciated from the foregoing description that since, according to the present invention, the consumable electrode arc welding power source is thus constructed and operated, various welding characteristics such as the number of short-circuits, the amount of produced spatter and the penetration depth can be very simply controlled by providing a small and inexpensive reactor having a fixed inductance in the primary welding current branch circuit of the arc welding power source and thus simply operating the knob of variable resistor to vary the rising characteristic of the short-circuit current and/or the falling characteristics of the arc current arbitrarily and independently.

What is claimed is:

1. A consumable electrode arc welding power source for performing short-circuit transfer welding with a short circuit interval during which an electrode contacts a base material and an arc interval following said short-circuit interval during which an arc is generated between said electrode and base material, said power source including output terminals for applying welding power across said electrode and base material, a short circuit voltage occurring across said output terminals during said short-circuit interval and an arc voltage occurring across said output terminals during said arc interval, said power source comprising:

short-circuit detection means for providing an output signal in response to the occurrence of said short-circuit interval;

arc detection means for providing an output signal in response to the occurrence of said arc interval;

first pulse current generating means enabled by said short-circuit detection means output for generating a short-circuit control signal during said short-circit interval, said first pulse current generating means including a first time constant circuit means for variably setting the time constant of the rise of said first pulse current during said short-circuit interval;

second pulse current generating means enabled by said arc detection means output for generating an arc control signal during said arc interval;

a base power supply for providing a predetermined small current to said output terminals during both said short-circuit and arc intervals;

a main power supply;

a switching element connected between said main power supply and output terminals and conductive in response to a drive signal; and drive means responsive to either said short-circuit control signal or arc control signal for providing said drive signal to said switching element, whereby a first pulse current is applied to said output terminals during said short-circuit interval and a second pulse current is applied to said output terminals during said arc interval.

2. The power source as claimed in claim 1, wherein said first pulse generating means is disabled by said arc detection means output.

3. The power source as claimed in claim 1, further comprising timing means enabled by said arc detection means output for providing a timing signal a predetermined time after commencement of said arc interval, said timing signal disabling said second pulse generating means.

4. The power source as claimed in claim 1, in which said first time constant circuit means includes a capacitor which is charged when said short-circuit detection means detects said short-circuit interval, a charging resistor connected to said capacitor, and a discharging resistor for discharging said capacitor.

5. The power source as claimed in claim 1 wherein said second pulse current generating means includes a second time constant circuit means for gradually decreasing the second pulse current during said arc interval.

6. The power source as claimed in claim 5 in which said second time constant circuit means includes a capacitor charged when said arc detection means detects said arc interval, a discharging resistor for discharging said capacitor, and a semiconductor active element conductive during said arc interval for allowing said capacitor to discharge through said discharging resistor.

7. The power source as claimed in claim 1 wherein said first pulse current generating means has a peak setting element for varying the maximum peak value of said first pulse current in accordance with the diameter and material of the wire electrode.

8. The power source as claimed in claim 7 wherein said first time constant circuit means includes a wire electrodes diameter changeover switch means for switching said peak value setting unit.

9. A consumable electrode arc welding power source for performing short-circuit transfer welding with a short-circuit interval during which an electrode contacts a base material and an arc interval following said short-circuit interval during which an arc is generated between said electrode and base material, said power source including output terminals for applying welding power across said electrode and base material, a short-circuit voltage occurring across said output terminals during said short-circuit interval and an arc voltage occurring across said output terminal storing said arc interval, said power source comprising:

a main power supply;

a switching element connected between said main power supply and said output terminals and conducting in response to a drive signal;

drive means responsive to a control signal for generating said drive signal;

monitoring means for monitoring the level of current flowing through said output terminals and generating an output signal; and control means responsive to said monitoring means output for generating said control signal, said control means including: a comparison means for generating said control signal in accordance with the comparison of said monitoring means output signal and a reference signal, and reference signal generating means for generating a variable reference signal, said reference voltage generating means comprising short-circuit detection means for providing an output signal in response to the occurrence of said short-circuit interval and time constant means receiving said output signal of said short-circuit detection means and providing to said comparison means a reference voltage which increases with a desired time constant, whereby said current through said output terminals is controlled in accordance with said variable reference signal.

10. A power source as claimed in claim 9, wherein said time constant means includes means for varying said desired time constant.

* * * * *